United States Patent
Koppe et al.

[11] 3,914,432
[45] Oct. 21, 1975

[54] PHARMACEUTICAL COMPOSITIONS CONTAINING A 1-(CYANO-PHENOXY)-2-HYDROXY-3-ALKYLAMINO-PROPANE AND METHOD OF USE

[75] Inventors: Herbert Köppe; Werner Kummer; Helmut Stähle; Karl Zeile, all of Ingelheim am Rhein; Albrecht Engelhardt, Main (Rhine), all of Germany

[73] Assignee: Boehringer Ingelheim GmbH, Ingelheim am Rhein, Germany

[22] Filed: Jan. 16, 1975

[21] Appl. No.: 541,430

Related U.S. Application Data

[60] Division of Ser. No. 204,316, Dec. 2, 1971, Pat. No. 3,872,147, which is a continuation of Ser. No. 781,985, Dec. 6, 1968, abandoned.

[30] Foreign Application Priority Data

Dec. 13, 1967  Germany............................ 1643262

[52] U.S. Cl. .............................................. 424/304
[51] Int. Cl.² ........................................ A61K 31/275
[58] Field of Search .................................... 424/304

[56] References Cited
UNITED STATES PATENTS 3,663,607  5/1972  Barrett et al...................... 424/304
3,740,444  6/1973  Koppe et al. ...................... 424/304

*Primary Examiner*—Sam Rosen
*Attorney, Agent, or Firm*—Hammond & Littell

[57] ABSTRACT

Pharmaceutical compositions containing as an active ingredient a compound of the formula

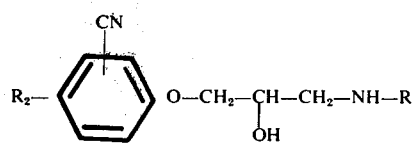

wherein
R is branched alkyl of 5 to 8 carbon atoms containing a quaternary carbon atom which is attached directly or through an alkylene chain of 1 to 4 carbon atoms to the amino nitrogen atom, and
$R_2$ is hydrogen or chlorine, or a non-toxic, pharmacologically acceptable acid addition salt thereof; and a method of using the same as β-adrenolytics and hypotensives.

6 Claims, No Drawings

PHARMACEUTICAL COMPOSITIONS CONTAINING A 1-(CYANO-PHENOXY)-2-HYDROXY-3-ALKYLAMINO-PROPANE AND METHOD OF USE

This is a division of copending application Ser. No. 204,316, filed Dec. 2, 1971, now U.S. Pat. No. 3,872,147, which in turn is a continuation of application Ser. No. 781,985, filed Dec. 6, 1968, now abandoned.

This invention relates to novel pharmaceutical compositions containing as an active ingredient a 1-(cyano-phenoxy)-2-hydroxy-3-alkylamino-propane or a non-toxic acid addition salt thereof, as well as to a method of using the same as $\beta$-adrenolytics and hypotensives.

More particularly, the present invention relates to novel pharmaceutical dosage unit compositions containing as an active ingredient a compound of the formula

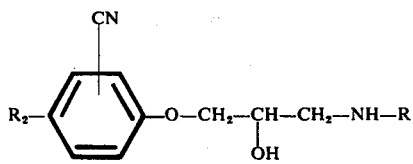

wherein
R is branched alkyl of 5 to 8 carbon atoms containing a quaternary carbon atom which is attached directly or through an alkylene chain of 1 to 4 carbon atoms to the amino nitrogen atom, and
$R_2$ is hydrogen or chlorine,
or a non-toxic, pharmacologically acceptable acid addition salt thereof.

The compounds of the formula I may be prepared by various methods involving well known chemical principles, among which the following have proved to be particularly efficient and convenient:

Method A

By reacting a compound of the formula

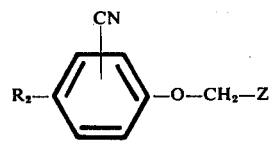

wherein $R_2$ has the same meanings as in formula I and Z is

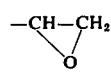

or —CH(OH)—CH$_2$—Hal, where Hal is halogen, with an alkylamine of the formula $$NH_2-R \qquad (III)$$

wherein R has the same meanings as in formula I, in a manner and under conditions which are customary for such reactions.

Method B

By splitting off an easily removable protective group from a compound of the formula

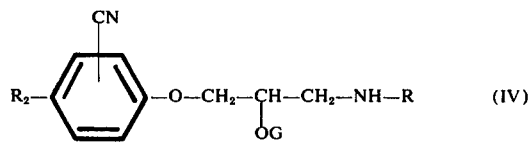

wherein R and $R_2$ have the same meanings as in formula I and G is a hydrolytically removable protective group, such as acyl or acetal.

Method C

By converting the substituent A in a compound of the formula

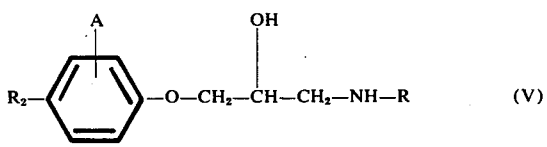

into a cyano substituent. R and $R_2$ in formula V have the same meanings as in formula I, and A may have any one of the following meanings:
—CONH$_2$ or —CH=NOH, which are convertible into cyano by dehydration; or
Amino, which is convertible into cyano by diazotization and heating with copper(I)-cyanide.

The conversion of a compund of the formula V into a compound of the formula I is effected by applying the required known reaction, i.e., dehydration or diazotization and subsequent heating with a copper(I)cyanide, to the particular compound of the formula V.

Method D

By introducing a chlorine substituent onto the phenyl ring of a compound of the formula

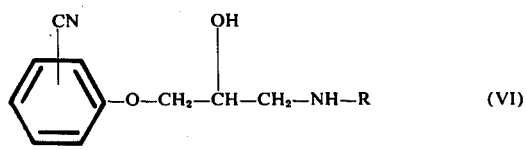

wherein R has the same meaning as in formula I.

The introduction of the chlorine substituent may be effected by reacting a compound of the formula VI with a mixture of concentrated hydrogen peroxide and hydrochloric acid at elevated temperatures.

The starting compounds required for methods A through D are either known compounds or may be prepared according to known procedures.

For instance, an epoxide of the formula II may be prepared by reacting epichlorohydrin with a corresponding phenol or phenolate of the formula

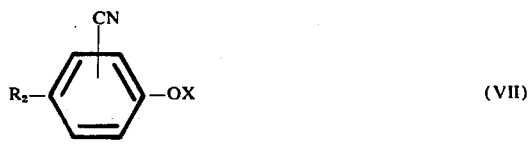

wherein $R_2$ has the same meanings as in formula I and X is hydrogen or a cation, especialy an alkali metal cation. An epoxide of the formula II, in turn, may be used for the preparation of other starting compounds; for example, a halohydrin of the formula II may be prepared by reacting the corresponding epoxide with a hydrohalic acid.

A compound of the formula IV may be prepared by reacting a halohydrin of the formula II with a compound which forms a protective group G, such as vinyl ether or dihydropyran, and subsequently reacting the compound of the formula

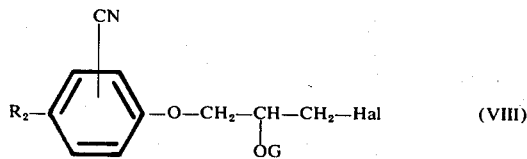  (VIII)

formed thereby, wherein $R_2$ and G have the same meanings as in formula IV and Hal is halogen, with an amine of the formula III.

Finally, compounds of the formulas V and VI may be prepared pursuant to method A described herein, i.e., starting from a corresponding phenol by way of the corresponding 1-(cyano-phenoxy)-2,3-epoxypropane and reaction of the latter with an alkylamine of the formula III.

The compounds according to the present invention comprise an asymmetric carbon atom and therefore occur as racemic mixtures as well as in the form of optically active antipodes. The latter may be obtained by separating the racemic mixture with an aid of customary auxiliary acids, such as dibenzoyl-D-tartaric acid or D-3-bromocamphor-8-sulfonic acid, or also by using the corresponding optically active starting compound.

The compounds of the formula I are organic bases and therefore form acid addition salts with inorganic or organic acids. Examples of non-toxic, pharmacologically acceptable acid addition salts are those formed with hydrochloric acid, hydrobromic acid, sulfuric acid, methane-sulfonic acid, maleic acid, acetic acid, oxalic acid, lactic acid, tartaric acid, 8-chlorotheophylline and the like. Such acid addition salts may be obtained by conventional methods, for instance, by dissolving the free base in a suitable inert solvent and acidifying the solution with the desired inorganic or organic acid.

The following examples illustrate the preparation of compounds of the formula I.

EXAMPLE 1

1-(o-cyano-phenoxy)-2-hydroxy-3-[(α,α-dimethyl-n-propyl)-amino]-propane and its hydrochloride by Method A 14 gm of 82% α,α-dimethyl-n-propyl-amine were added to a solution of 10.5 gm (0.06 mol) of 1-(o-cyanophenoxy)-2,3-epoxy-propane in 80 cc of ethanol, the mixture was allowed to stand for 24 hours at 20°C, and thereafter it was refluxed on a boiling water bath for about 3 hours. Subsequently, the ethanol was distilled off in vacuo, the residue was digested with dilute hydrochloric acid, the insoluble matter was separated, and the acid solution was made alkaline with sodium hydroxide. The base precipitated thereby was taken up in ether, the organic phase was dried over magnesium sulfate, and the ether was distilled off. The residue, 1-(o-cyano-phenoxy)-2-hydroxy-3-[(α,α-dimethyl-n-propyl)-amino]-propane, was dissolved in acetonitrile, the solution was acidified with ethereal hydrochloric acid, and the crystalline precipitate was recrystallized from ethanol/ether, yielding 7.6 gm of the colorless crystalline hydrochloride, m.p. 134°–136°C, of the formula

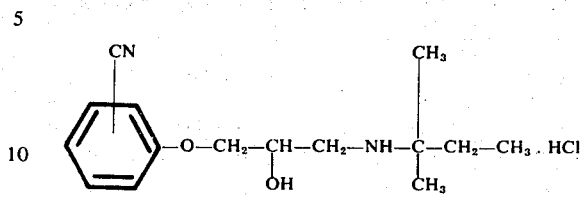

Using a procedure analogous to that described in Example 1, the following additional 1-(o-cyano-phenoxy)-2-hydroxy-3-alkylamino-propanes and their hydrochlorides of the formula

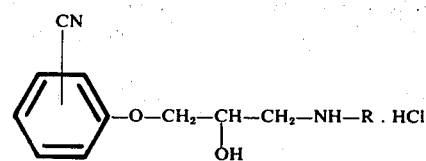

were prepared from 1-(o-cyano-phenoxy)-2,3-epoxy-propane and the corresponding primary amine of the formula III above:

| Ex. No. | R | M.P. (Hydrochloride) °C |
|---|---|---|
| 2 | $-CH_2-\underset{\underset{CH_3}{|}}{\overset{\overset{CH_3}{|}}{C}}-CH_3$ | 163 – 165 |
| 3 | $-\underset{\underset{CH_3}{|}}{\overset{\overset{CH_3}{|}}{C}}-C_3H_7$ | 131 – 132 |
| 4 | $-\underset{\underset{CH_3}{|}}{\overset{\overset{CH_3}{|}}{C}}-C_4H_9$ | 148 – 150 |
| 5 | $-\underset{\underset{CH_3}{|}}{\overset{\overset{C_2H_5}{|}}{C}}-C_2H_5$ | 144 – 147 |
| 6 | $-\underset{\underset{C_3H_7}{|}}{\overset{\overset{CH_3}{|}}{C}}-C_2H_5$ | 154 – 157 |
| 7 | $-\underset{\underset{CH_3}{|}}{\overset{\overset{CH_3}{|}}{C}}-CH_2-\underset{\underset{CH_3}{|}}{\overset{\overset{CH_3}{|}}{C}}-CH_3$ | 145 – 148 |
| 8 | $-C(C_2H_5)_3$ | 157 – 158 |
| 9 | $-\underset{\underset{CH_3}{|}}{\overset{\overset{CH_3}{|}}{C}}-iC_3H_7$ | 175 – 177 |
| 10 | $-\underset{\underset{CH_3}{|}}{\overset{\overset{CH_3}{|}}{C}}-CH_2-iC_3H_7$ | 137 – 139 |
| 11 | $-\underset{\underset{CH_3}{|}}{\overset{\overset{CH_3}{|}}{C}}-tert.C_4H_9$ | 218 – 220 |
| 12 | $-\underset{\underset{CH_3}{|}}{\overset{\overset{CH_3}{|}}{C}}-C_5H_{11}$ | 145 – 148 |

-continued

| Ex. No. | R | M.P. (Hydrochloride) °C |
|---|---|---|
| 13 | —C(CH₃)₂—(CH₂)₂—iC₃H₇ | 128 – 131 |

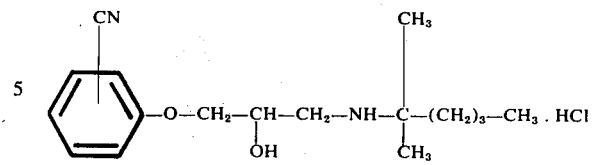

Using a procedure analogous to that described in Example 1, the following additional 1-(cyano-phenoxy)-2-hydroxy-3-alkyl-amino-propanes and their hydrochlorides of the formula

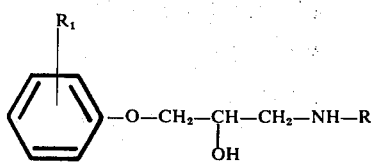

were prepared from the corresponding 1-(cyano-phenoxy)-2,3-propane and primary amine of the formula III:

| Example No. | R | R₁ | Fp (Hydrochloride) °C |
|---|---|---|---|
| 14 | —C(CH₃)₂—C₃H₇ | 3—CN | 139 – 141 |
| 15 | —C(CH₃)(C₂H₅)—C₂H₅ | 4—CN | 203 – 206 |

EXAMPLE 16

1-(o-cyano-phenoxy)-2-hydroxy-3-[(α,α-dimethyl-n-pentyl)-amino]-propane and its hydrochloride by method A 2.1 gm (0.087 mol) of 1-(o-cyano-phenoxy)-2-hydroxy-3-bromo-propane were dissolved in 50 cc of ethanol, 2 gm (0.0175 mol) of tert.heptylamine (α,α-dimethyl-n-pentyl-amine) were added to the solution, and the mixture was refluxed for 2 hours. Thereafter, the ethanol was distilled off, the residue was digested with dilute NaOH, the aqueous alkaline mixture was extracted with ether, the ethereal extract solution was washed with water and dried over magnesiuim sulfate, and the ether was distilled off. 3 gm of raw 1-(o-cyano-phenoxy)-2-hydroxy-3-[(α,α-dimethyl-n-pentyl)-amino]-propane remained behind, which were dissolved in a small amount of ethanol, the resulting solution was acidified with etheral hydrochloric acid, and the precipitate formed thereby was recrystallized from ethanol/ether, yielding 2.8 gm of the hydrochloride, m.p. 144°–145°C, of the formula

EXAMPLE 17

1-(o-cyano-p-chloro-phenoxy)-2-hydroxy-3-[(α-methyl-α-ethyl-n-butyl)-amino]-propane and its hydrochloride by method D 6.52 gm (0.02 mol) of 1-(o-cyano-phenoxy)-3-[(α-methyl-α-ethyl-n-butyl)-amino]-propane hydrochloride were dissolved in 55 cc of concentrated hydrochloric acid, and then 2.7 gm (0.024 mol) of 30% hydrogen peroxide were added dropwise to the solution at about 45°C, whereby the internal temperature rose to 65°C. The reaction mixture was thereafter stirred at 60°C for 30 minutes, then concentrated by evaporation in vacuo, made alkaline with dilute sodium hydroxide, and the oily product precipitated thereby was taken up in ether. The ethereal solution was washed with water, dried over magnesium sulfate, and evaporated to dryness in vacuo. The solid residue was dissolved in ethyl acetate and recrystallized therefrom by addition of petroleum ether. The pure crystalline base, 1-(o-cyano-p-chloro-phenoxy)-2-hydroxy-3-[(α-methyl-α-ethyl-n-butyl)-amino]-propane, was dissolved in ether, and the resulting solution was acidified with ethereal hydrochloric acid. The precipitate formed thereby was collected and recrystallized from acetonitrile/ether, yielding 2 gm of the hydrochloride, m.p. 143°–145°C, of the formula

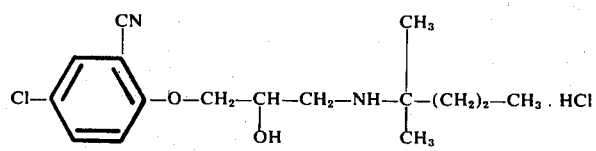

EXAMPLE 18

1-(m-cyano-phenoxy)-2-hydroxy-3-[(α,α-dimethyl-n-butyl)-amino]-propane and its hydrochloride by method C 3.39 gm (0.01 mol) of 1-(m-amino-phenoxy)-2-hydroxy-3-[(α,α-dimethyl-n-butyl)-amino]-propane hydrochloride were dissolved in 3.5 cc of concentrated hydrochloric acid, and the solution was diluted with 20 cc of water. The aqueous solution was cooled to 10°C, and then, while stirring, a solution of 1.4 gm (0.02 mol) of NaNO₂ in 10 cc of water was added dropwise over a period of 15 minutes. Thereafter, the mixture was stirred for 30 minutes more at 10°C, and then a solution of 5 gm of CuSO₄ · 5H₂O and 5.6 gm of potassium cyanide in 30 cc of water, heated to 90°C, was added dropwise to the mixture at 80°–90°C over a period of 20 minutes, accompanied by stirring. Subsequently, the aqueous phase was decanted from resinous components which had formed and was then extracted with chloroform. The organic phase was washed with water, dried over magnesium sulfate and evaporated in vacuo. The residue, raw 1-(m-cyano-phenoxy)-2-hydroxy-3-[(α,α-dimethyl-n-butyl)-amino]-propane, was dissolved in a small amount of ethanol, the solution was acidified with ethereal hydrochloric acid, and the crystalline precipitate formed thereby was recrystallized from ethanol/ether, yielding 0.7 gm of the hydrochloride, m.p. 138°–140°C, of the formula

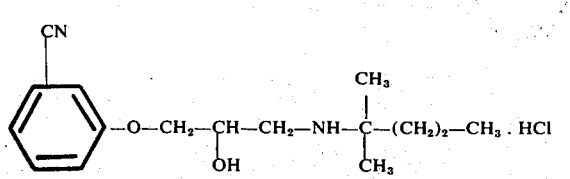

The compounds embraced by formula I above and their non-toxic, pharmacologically acceptable acid addition salts, have useful pharmacodynamic properties. More particularly, they exhibit β-adrenolytic and hypotensive activities in warm-blooded animals, as confirmed by in vivo tests on guinea pigs. Thus, the compounds are useful for the treatment and prophylaxis of diseases of the coronary heart vessels and cardiac arrythmia, especially tachicardia, in warm-blooded animals.

For pharmaceutical purposes the compounds of the formula I or their non-toxic acid addition salts are administered to warm-blooded animals perorally or parenterally as sole active ingredients or in combination with other pharmacodynamically active ingredients, such as coronary dilators or sympathicomimetics, in customary dosage unit compositions, that is, compositions in dosage unit form consisting of essentially of an inert pharmaceutical carrier and one effective dosage unit of the active ingredient, such as tablets, coated pills, capsules, wafers, powders, solutions, suspensions, emulsions, syrups, suppositories and the like. One effective dosage unit of the compounds is from 0.0166 to 5.0 mgm/kg body weight, preferably 0.083 to 1.67 mgm/kg (peroral) or 0.0166 to 0.34 mgm/kg (parenteral).

The following examples illustrate a few dosage unit compositions comprising a compound of the formula I or a nontoxic acid addition salt thereof as an active ingredient and represent the best mode contemplated of putting the invention to practical use. The parts are parts by weight unless otherwise specified.

EXAMPLE 19

Tablets

The tablet composition was compounded from the following ingredients:

| | | |
|---|---:|---|
| 1-(o-Cyano-phenoxy)-2-hydroxy-3-[(α,α-dimethyl-n-propyl)-amino]-propane hydrochloride | 40.0 | parts |
| Corn starch | 164.0 | '' |
| Secondary calcium phosphate | 240.0 | '' |
| Magnesium stearate | 1.0 | '' |
| Total | 445.0 | parts |

Compounding procedure:

The individual ingredients were intimately admixed with each other, the mixture was granulated in customary fashion, and the granulate was pressed into 445 mgm-tablets. Each tablet contained 40 mgm of the phenoxy-amino propanol compound and, when administered perorally to a warm-blooded animal of about 60 kg body weight in need of such treatment, produceed very good β-adrenolytic effects.

EXAMPLE 20

Gelatin capsules

The capsule filler composition was compounded from the following ingredients:

| | | |
|---|---:|---|
| 1-(o-Cyano-phenoxy)-2-hydroxy-3-[(α,α-dimethyl-n-butyl)-amino]-propane hydrochloride | 25.0 | parts |
| Corn starch | 175.0 | '' |
| Total | 200.0 | parts |

Compounding procedure:

The ingredients were intimately admixed with each other, and 200 mgm-portions of the mixture were filled into gelatin capsules of suitable size. Each capsule contained 25 mgm of the phenoxy-amino-propanol compound and, when administered perorally to a warm-blooded animal of about 60 kg body weight in need of such treatment, produced very good β-adrenolytic effects.

EXAMPLE 21

Hypodermic solution

The solution was compounded from the following ingredients:

| | | |
|---|---:|---|
| 1-(m-Cyano-phenoxy)-2-hydroxy-3-[(α,α-dimethyl-n-propyl)-amino]-propane hydrochloride | 25 | parts |
| Sodium salt of EDTA | 2 | '' |
| Distilled water q.s.ad | 1000 | '' |
| | | by vol. |

Compounding procedure:

The propanol compound and the EDTA salt were dissolved in a sufficient amount of distilled water, and the solution was diluted to the indicated volume with additional distilled water, filtered until free from suspended particles, and filled into 1 cc-ampules under aspetic conditions, which were finally sterilized and sealed. Each ampule contained 25 mgm of the phenoxy-amino-propanol compound, and when the contents thereof were administered intravenously to a warm-blooded animal of about 60 kg body weight in need of such treatment, very good β-adrenolytic effects were produced.

EXAMPLE 22

Sustained release pills

The pill core composition was compounded from the following ingredients:

| | | |
|---|---:|---|
| 1-(o-Cyano-phenoxy)-2-hydroxy-3-[(α,α-dimethyl-n-propyl)-amino]-propane hydrochloride | 25.0 | parts |
| Carboxymethyl cellulose (CMC) | 295.0 | '' |
| Stearic acid | 20.0 | '' |
| Cellulose acetate phthalate (CAP) | 40.0 | '' |
| Total | 380.0 | parts |

Compounding procedure:

The propanol compound, the CMC and the stearic acid were intimately admixed with each other, the mixture was granulated in customary fashion with a solution of the CAP in 200 cc of a mixture of ethanol and ethyl acetate, and the granulate was pressed into 380 mgm-pill cores which were then coated with a sugar-containing 5% solution of polyvinyl-pyrrolidone in water. Each pill contained 25 mgm of the phenoxy-amino-propanol compound and, when administered perorally to a warm-blooded animal of about 60 kg body weight in need of such treatment, produced very good β-adrenolytic effects.

EXAMPLE 23

Tablets with combination of active ingredients

The tablet composition was compounded from the following ingredients:

| | | |
|---|---:|---|
| 1-(o-Cyano-phenoxy)-2-hydroxy-3-[(α,α-dimethyl-n-propyl)-amino]-propane hydrochloride | 35.0 | parts |
| 2,6-Bis-(diethanolamino)-4,8-dipiperidino-pyrimido[5,4-d]pyrimidine | 75.0 | " |
| Lactose | 164.0 | " |
| Corn Starch | 194.0 | " |
| Colloidal silicic acid | 14.0 | " |
| Polyvinylpyrrolidone | 6.0 | " |
| Magnesium stearate | 2.0 | " |
| Soluble starch | 10.0 | " |
| Total | 500.0 | parts |

Compounding procedure:

The propanol compound, the pyrimidopyrimide compound, the lactose, the corn starch, the colloidal silicic acid and the polyvinylpyrrolidone were intimately admixed with each other, the mixture was granulated in customary fashion with an aqueous solution of the soluble starch, the granulate was admixed with the magnesium stearate, and the composition was pressed into 500 mgm-tablets. Each tablet contaned 35 mgm of the phenoxy-amino-propanol compound and 75 mgm of the pyrimido-pyrmidine compound and, when administered perorally to a warm-blooded animal of about 60 kg body weight in need of such treatment, produced very good β-adrenolytic and coronary dilating effects.

Analogous results were obtained when an equal amount of any one of the other compounds embraced by formula I above or a non-toxic acid addition salt thereof was substituted for the particular phenoxy-amino-propanol compounds in Examples 19 through 23. Likewise, the amount of active ingredient in these examples may be varied to achieve the dosage unit range set forth above, and the amounts and nature of the inert pharmaceutical carrier ingredients may be varied to meet particular requirements.

While the present invention has been illustrated with the aid of certain specific embodiments thereof, it will be readily apparent to others skilled in the art that the invention is not limited to these particular embodiments, and that various changes and modifications may be made without departing from the spirit of the invention or the scope of the appended claims.

We claim:

1. A pharmaceutical dosage unit composition consisting essentially of an inert pharmaceutical carrier and an effective β-adrenolytic or hypotensive amount of compound of the formula

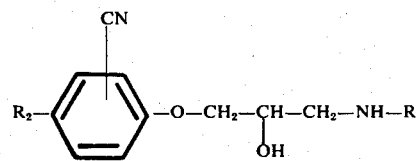

wherein
R is branched alkyl of 5 to 8 carbon atoms containing a quaternary carbon atom which is attached directly or through an alkylene chain of 1 to 4 carbon atoms to the amino nitrogen atom, and
$R_2$ is hydrogen or chlorione,
or a non-toxic pharmacologically acceptable acid addition salt thereof.

2. A composition of claim 1, wherein said compound is 1-(o-cyano-phenoxy)-2-hydroxy-3-[(α,α-dimethyl-n-propyl)-amino]-propane or a non-toxic, pharmacologically acceptable acid addition salt thereof.

3. A composition of claim 1, wherein said compound is 1-(o-cyano-phenoxy)-2-hydroxy-3-[(α,α-dimethyl-n-butyl)-amino]-propane or a non-toxic, pharmacologically acceptable acid addition salt thereof.

4. The method of blocking the β-adrenergic receptors and lowering the blood pressure in a warm-blooded animal in need of such treatment, which comprises administering to said animal an effective β-adrenolytic or hypotensive amount of a compound of the formula

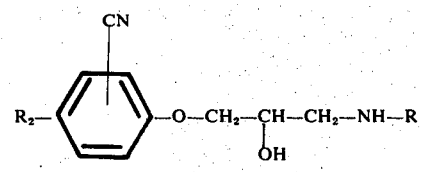

wherein
R is branched alkyl of 5 to 8 carbon atoms containing a quaternary carbon atom which is attached directly or through an alkylene chain of 1 to 4 carbon atoms to the amino nitrogen atom, and
$R_2$ is hydrogen or chlorine,
or a non-toxic, pharmacologically acceptable acid addition salt thereof.

5. The method of claim 4, wherein said compound is 1-(o-cyano-phenoxy)-2-hydroxy-3-[(α,α-dimethyl-n-propyl)-amino]-propane or a non-toxic, pharmacologically acceptable acid addition salt thereof.

6. The method of claim 4, wherein said compound is 1-(o-cyano-phenoxy)-2-hydroxy-3-[(α,α-dimethyl-n-butyl)-amino]-propane or a non-toxic, pharmacologically acceptable acid addition salt thereof.

* * * * *